United States Patent [19]
Mylett

[11] Patent Number: 4,875,719
[45] Date of Patent: Oct. 24, 1989

[54] UNIVERSAL HOSE CONNECTOR

[76] Inventor: Christopher J. Mylett, 15502 Wandering Trail, Friendswood, Tex. 77546

[21] Appl. No.: 301,974

[22] Filed: Jan. 26, 1989

[51] Int. Cl.⁴ .............................................. F16L 33/00
[52] U.S. Cl. .................................... 285/239; 285/259
[58] Field of Search ............... 285/239, 256, 254, 246, 285/247

[56] References Cited
U.S. PATENT DOCUMENTS

| | | | |
|---|---|---|---|
| 1,952,416 | 3/1934 | Brunner | 285/259 X |
| 3,046,698 | 7/1962 | Breen et al. | 285/259 X |
| 4,597,594 | 7/1986 | Kacalieff | 285/239 |

FOREIGN PATENT DOCUMENTS 1141189  8/1957  France ................................. 285/259

*Primary Examiner*—Dave W. Arola
*Attorney, Agent, or Firm*—Richard C. Litman

[57] ABSTRACT

A connector for joining the ends of flexible hoses comprising a generally cylindrical body tapering from a central section to a smaller diameter cylindrical section extending to an annular end section. The tapered section and the end section comprise circular barb rings having frustonconical sections and sharp edges. Each section is in turn comprised of several annular barb rings each having a frustoconical outer face and sharp edges. The connector is particularly suited for applications where longitudinal and lateral forces on the tube must be tolerated, as well as variations in tube diameter.

2 Claims, 1 Drawing Sheet

UNIVERSAL HOSE CONNECTOR

FIELD OF THE INVENTION

This invention relates to an improvement in clampless connectors for flexible hose and tubing.

BACKGROUND OF THE INVENTION

Hose connectors of the so-called barb or clampless type having stacked adjacent annular barb projections have been in use for many years in a wide variety of applications. Their simplicity, cost and ease of installation all account for their continuing popularity.

Nevertheless, all barb hose connectors which utilize no encircling clamps or straps to retain them in position are limited in their usefulness in several ways. A primary problem is leaking caused by poor sealing between the connector and the hose. Extreme pressures and cycles of high and low pressure tend to cause leaks, as do mechanical flexing and stretching of the hose. A further problem is that hose connectors which overcome these problems are useful over a very small range of tubing sizes and types.

DESCRIPTION OF THE RELATED ART

The hose connectors of U.S. Pat. Nos. 3,210,100 issued to Lowles et al. and 3,966,238 issued to Washkewicz et al. are of this latter type. Both teach a very specific barb shape to be used with a limited range of tube compositions and tube dimensions.

Tapered connectors having stacked barbs of progressively increasing diameter have the capacity to accept tubing of different diameters so long as the connector can enter the tubing far enough to establish sealing and retention of the tubing. Tapered connectors, however, are prone to loss of retention when the tubing is flexed or pulled laterally, particularly if the penetration of the connector into the tubing is shallow. Forcing the tubing over the entire barbed section toward the central portion relieves this problem, as disclosed in U.S. Pat. No. 4,597,594 issued to Kacalieff et al. which has supporting ribs mid-span over which the tubing is installed.

SUMMARY OF THE INVENTION

By the present invention, an improved hose connector for flexible hoses which will connect hoses of different diameters and compositions and retain them is described below.

Accordingly, one of the objects of the present invention is to provide an improved hose connector which can be connected with hose having a range of bore diameters.

Another object is to provide a hose connector which is readily inserted manually into a variety of hoses to the depth necessary for reliable retention and sealing.

It is still another object to provide a hose connector with reliable retention and sealing under a variety of fluid media pressures and pressure cycles.

It is a further object to provide a connector having improved retention of the hose on the connector against longitudinal tensile forces on the hose.

It is a still further object to provide a connector having improved retention of the hose on the connector against lateral tension on the hose.

With these and other objects in view which will more readily appear as the nature of the invention is better understood, the invention consists in the novel construction, combination and assembly of parts hereinafter more fully described, illustrated and claimed, with reference being made to the attached drawings.

BRIEF DESCRIPTION OF THE DRAWINGS

Similar reference characters designate corresponding parts throughout the two figures of the drawings accompanying this application.

DESCRIPTION OF THE PREFERRED EMBODIMENT

Figure 1:
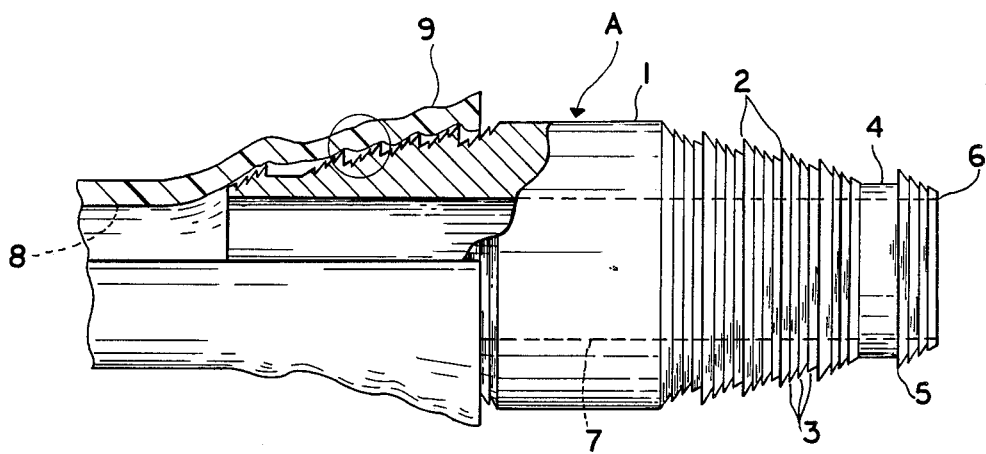
FIG. 1 is a partially sectioned side view of the universal hose connector showing the configuration of the barbs and the extended cylindrical section.
Figure 2:
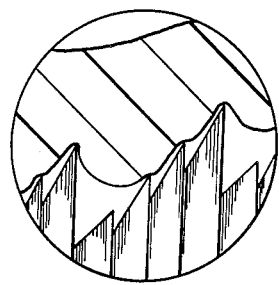
FIG. 2 is an expanded sectional view of the barbs to further show their configuration .

As shown in FIGS. 1 and 2, the body of the universal hose connector A is longitudinally symmetrical, having a cylindrical mid-section 1 adjacent the large diameter of a tapered section whose surface is comprised of major barb rings 2. The small end of the tapered section continues into a cylindrical section 4 which has a single major barb ring 5 at its end. Major barb rings 2 and 5 comprise an inclined outer face intersecting with a substantially radial inner face. The inclined outer face of barb 2 further includes a plurality of minor barbs 3, each having an annular inclined outer face intersecting with a radial inner face to provide an outermost circular edge. This edge is relatively sharp, to permit deep penetration of the barbs 2,3,5 into the interior wall 8 of the tubing. The connector has a central bore 7 which extends through its entire length. The connector may be fabricated from metal, plastic or any other material suitable for its intended use.

The arrangement of the barbs 2,3,7 and the cylindrical section 4 has the effect of providing improved gripping or retention of the connector. Fluid pressure within the tubing or longitudinal tension caused by pulling on the tubing tends to shift the tubing 9 axially toward the planar end 6 of the connector. This shifting in turn causes the barbs 2,3,5 to penetrate the inner wall 8 of flexible tubing 9, thus improving the sealing of the fluid and increasing the retention of the tubing on the connector. The depth to which the barbs penetrate increases as the longitudinal forces on the tubing increase until the tubing material is in contact with the entire barb surface. Harder tubing compounds will naturally be penetrated less, while softer compounds will penetrate around the large barb as well. In both cases, the number of barb edges penetrating the material is large.

Labyrinth seals which utilize stacked seal rings to limit flow leakage rely on the principle that each ring blocks a more or less fixed percentage of the flow, until it is reduced to a satisfactory level. If the first ring blocks 99% of the flow, for example, a second ring will block 99% of the 1% remaining, a third ring 99% of that remainder, and so on. Rings are added until an acceptable leakage rate is reached. This principle applies to the present invention as well. The relatively large number of barbs provides improved sealing.

The barbs 2,3,5 of the present invention also act to distribute the longitudinal forces differently, each barb receiving a smaller percentage of these forces by virtue of their relatively large number. Larger barbs penetrate hose linings more deeply, producing greater shear forces and cutting the hose lining if the force is excessive. Hence, distributing the shear forces over a larger number of barbs reduces the force of each individual barb, thereby reducing the tendency to cut the inner hose wall 8.

Forces produced when the hose is pulled laterally to the connector are absorbed, in part, by the outer barb 5, which, by virtue of its extension at the end of the cylindrical section 4, acts to absorb forces generated by a lateral pull on the tubing. These forces are absorbed primarily by the minor barbs 3 on the outer barb 5, whose sharp edges act to bite into the inner wall. The forces remaining, which are transmitted to barbs 2,3, are now longitudinal and are absorbed by them.

The planar cylindrical section should be sufficiently long to cooperate with the end barb in absorbing lateral pulling. It may also serve as an area around which a hose clamp, surrounding the outer wall of the tubing, can be tightened sufficiently to prevent the clamp sliding over the end barb, should clamping be required under extreme operating conditions.

The fit of the outer barb within the tubing is not critical, as its function is primarily to absorb lateral forces from the tubing. Thus, a tube having a diameter in the upper range of usefulness will still be resistant to lateral pulling, even though the fit over the entire barb is not tight.

It is to be understood that the present invention is not limited to the sole embodiment described above, but encompasses any and all embodiments within the scope of the following claims.

I claim:

1. A coupling device for joining in a fluid-tight manner respective ends of two resilient tubing members, comprising:

an elongated cylindrical element having opposite end walls and provided with a central axially extending bore;

said element including a medial enlarged section defining the maximum diameter of said element;

a plurality of sets of outwardly directed major annular projections extending from said element intermediate said medial enlarged section and each said opposite end wall;

each major projection including an inclined outer face intersecting with a substantially radial inner face to provide an outermost circular edge;

said major projections progressively decreasing in diameter in a direction from said medial section toward said end wall, but not extending to said end wall;

each said major projection outer face having retaining means and sealing means;

a resilient tubing member force-fitted past each said end wall toward said medial section and stretched an increasing degree as said tubing member is forced toward said medial section, with said outer edges and said retaining means and sealing means providing a biting fluid-tight engagement with said tubing member;

a cylindrical planar extension adjacent each of said end walls; and an outermost single major projection outer face disposed between said cylindrical planar extension and said end wall having retaining means;

whereby force applied to said resilient tubing member increases biting engagement between said tubing member and said outermost major projection and reduces tensile force on remaining said projections.

2. A coupling device as claimed in claim 1 wherein said retaining means comprises a plurality of minor annular projections thereon of a progressively decreasing diameter from said circular edge toward said end wall.

* * * * *